United States Patent [19]

Heldt

[11] 3,886,707
[45] June 3, 1975

[54] DEVICE FOR ACHIEVING AN AXIALLY PRE-STRESSED JOINT

[75] Inventor: Karl Helge Konstantin Heldt, Partille, Sweden

[73] Assignee: SKF Industrial Trading & Development Company, Jutphaas, Netherlands

[22] Filed: Dec. 15, 1972

[21] Appl. No.: 315,470

[30] Foreign Application Priority Data
Feb. 7, 1972   Sweden.............................. 1364/72

[52] U.S. Cl................................. 52/758 F; 85/1 T
[51] Int. Cl............................................. F16b 5/02
[58] Field of Search .............. 85/62, 32 T, 1 T, 1 R; 151/31; 52/758 F

[56] References Cited
UNITED STATES PATENTS
2,479,075   8/1949   Martin................................ 151/31
3,130,628   4/1964   Blinn.................................. 85/1 T
FOREIGN PATENTS OR APPLICATIONS
913,851   12/1962   United Kingdom.................... 85/62

Primary Examiner—Edward C. Allen
Attorney, Agent, or Firm—Howson and Howson

[57] ABSTRACT

Device for achieving an axially pre-stressed screw joint for at least two parts. The device comprises a screw member having a first portion for axially securing the screw member in one of the parts in at least one direction and a threaded second portion axially spaced from the first portion and a nut member engageable with the second portion for axial takeup against the other part. The screw member is provided with a central axial bore having an opening at the axial end thereof receiving the nut member and terminating in a bottom wall adjacent the first portion of the screw member. A piston rod is mounted in the bore and secured to the screw member adjacent the opening end of the bore. The piston rod extends into said bore with the lower axial end face thereof spaced closely adjacent the bottom wall of said bore, and is provided with an axial channel for conveying a pressure medium into the space defined by the axial end face of the piston rod and the bottom wall of the bore.

3 Claims, 1 Drawing Figure

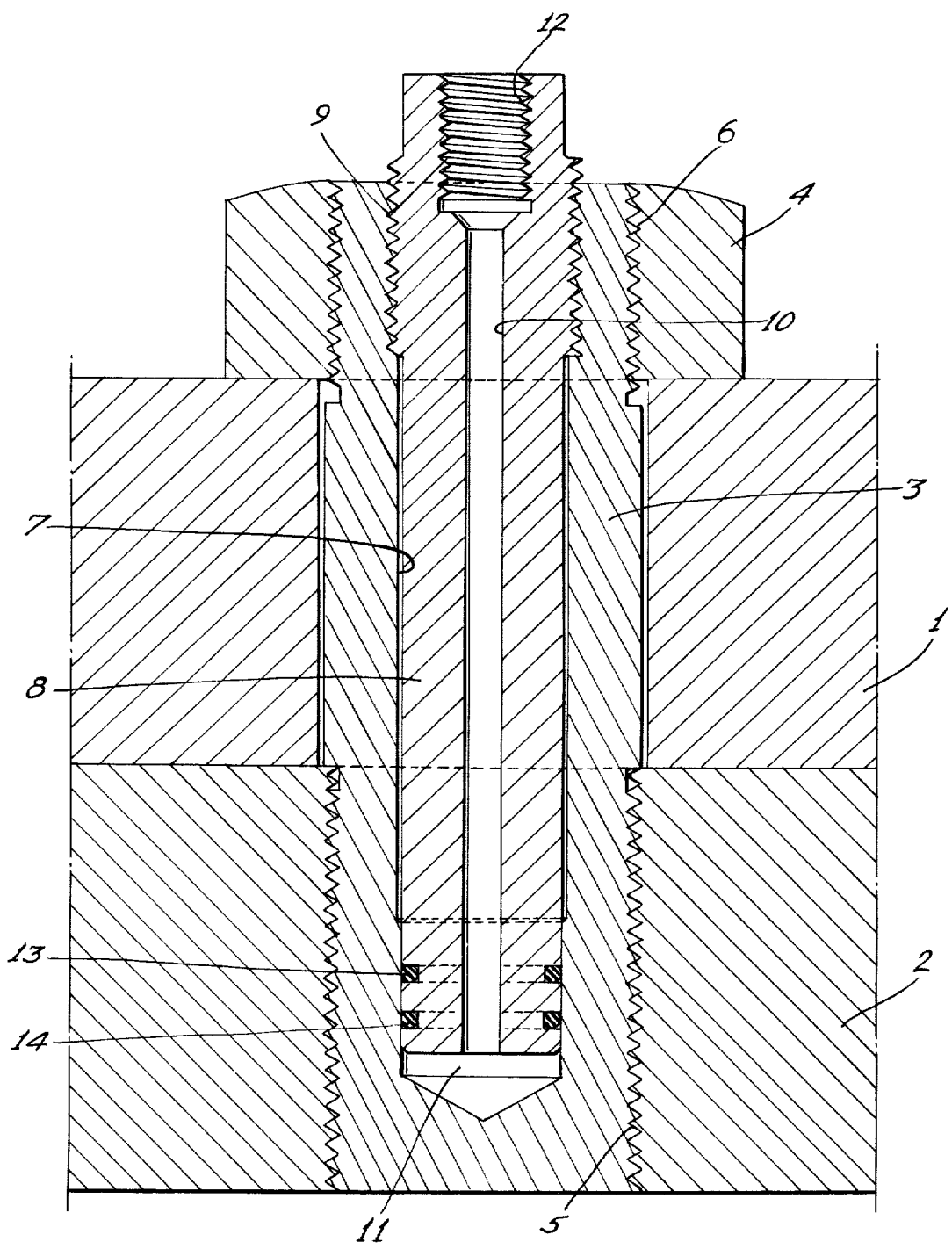

DEVICE FOR ACHIEVING AN AXIALLY PRE-STRESSED JOINT

BACKGROUND OF THE INVENTION

The invention relates to a device for achieving an axially pre-stressed joint between at least two parts, in which joint a screw is axially fixed in at least one direction in one of the parts to be connected and is provided with a threaded portion and a nut for axial fixation against the other part.

When tightening screws for pressure vessels, motor blocks and the like, a forcible and even tightening of all of the screws is required, which is difficult to achieve with mechanical tools such as adjustable wrenches, socket wrenches or adjustable torque wrenches. It is previously known to use hydraulic tools for tightening screws. Thereby the screws which are to be tightened must have a free threaded portion at one end outside the nut which is used for the tightening, on the threaded portion of which the hydraulic tool is fitted, whereby the tool is supported against one of the parts to be connected outside and around the nut. When a pressure medium is supplied to the tool, the screw is elongated, whereafter the nut is turned against one of the parts to be connected by a device which is integrated with the tool. Thereby the screw is pre-stressed without the necessity of applying a great torque to the nut. When the screw is tightened, the hydraulic tool is dismounted and may be used for other screws which are to be pre-stressed.

Tools of this kind have several disadvantages. They are composed by a plurality of parts and therefore expensive, and they require a lot of free space around every screw and nut for the application of the tool. The screws which are to be prestressed must be relatively long, because a threaded portion for the screw is required outside the nut, and since these portions are projecting, the threads are easily damaged.

SUMMARY OF THE INVENTION

To avoid these disadvantages, according to the present invention a device for achieving an axially pre-stressed screw joint is provided, which comprises a screw member having a first portion for axially securing it in one of the parts in at least one direction and a threaded portion axially spaced from the first portion and a nut member engageable with the threaded portion for axial takeup against the other part. A piston rod is mounted in a bore in the screw member and is secured to the screw member adjacent the opening end of the bore. The piston rod extends to a predetermined depth in the bore so that its lower axial end face is spaced closely adjacent the bottom wall of the bore. Thus, when pressure medium is conducted through an axial channel in the piston rod into the space defined by the axial end face of the piston rod and the bottom wall of the bore, the pressure medium acts on a portion of the bolt where possible radial expansion will not cause deformation of the threads on which the nut is mounted.

DESCRIPTION OF A SPECIFIC EMBODIMENT

One embodiment of the invention is described below in relation to the enclosed drawing, which shows a section of a device according to the invention.

Two parts 1 and 2 are intended to be connected by a screw 3 and a nut 4. The part 2 has a threaded bore 5 in which one end of the screw 3, which has a correspondingly threaded portion, is screwed. The nut 4 is screwed onto a threaded portion 6 at the other end of the screw and is intended to be pressed against the part 1. The screw 3 is provided with a central bore 7, in which a piston rod 8 is inserted. The piston can be fixed in the screw because it is provided with a threaded portion 9, which can be screwed into a correspondingly threaded portion at the free end of the bore 7. It is also possible to provide the bore and the piston rod with a bayonet joint or the like instead of threaded portions 9. The piston is provided with a central bore 10 which acts as a channel for a pressure medium which is intended to be pressed into a space 11 between the bottom of the piston 8 and the bottom and wall of the bore 7. At the free end of the bore 10 a connection 12 for a pressure fluid conduit is provided. At the inner end of the piston rod seals 13, 14 are provided for sealing between the piston and the wall of the bore 7. This wall is suitably finished in the area where the seals 13, 14 are contacting in order to prevent leakage and wear of the seals when the piston is mounted and dismounted.

The tightening of the screw is carried out by connecting a pressure fluid conduit at 12, whereby pressure fluid is pressed into the space 11 via the channel 10. The piston 8 is pressed upwardly by the pressure in the space 11, and by the fact that it is secured to the uppermost portion 9 of the screw 3, this screw is subjected to an axial tension which causes elongation of the screw, whereby the nut 4 can be turned against the part 1 without using great force.

When the fluid pressure is relieved and the screw tends to shrink, an axially pre-stressed screw joint is achieved when the nut 4 is pressed against the part 1 by the tension of the screw 3. With knowledge of the material and the dimensions of the screw 3 and the piston 8 it is possible to calculate the necessary fluid pressure for achieving the desired tension of the screw joint.

The pressure surface of the piston 8 ought to be situated as close to the bottom of the bore 7 as possible, partly for decreasing the necessary amount of pressure fluid by keeping the space 11 small, and partly for preventing radial expansion of the screw 3.

The bore 7 ought to be as long as possible in order to obtain the desired elongation of the screw when pressure medium is provided in the space 11. The bottom of the bore 7 should suitably be situated at that part of the screw 3, where the screw is axially fixed in the part 2, since this means that the screw is subjected to the most possible elongation when the pressure medium is provided in the space 11.

It is not necessary that the screw 3 be screwed into a threaded bore 5 in the part 2. The screw may for instance also be an integral part of the part 2. Also, the screw may be put through a bore in the part 2, whereby the lowermost portion of the screw can be provided with a head or a nut and a threaded portion.

In order to prevent contamination to enter the bore 7 when the piston 8 is not applied, a plug may be inserted in the free end of the bore 7. If a threaded portion 9 is provided at the free end, the plug may be provided with corresponding slightly tapered threads and be secured into the bore by turning, whereby the upper part of the screw is expanded and the nut 4 is locked.

I claim:

1. The combination comprising at least two parts having openings therein to receive a prestressed screw joint for connecting the parts, said screw joint consisting of an elongated screw member engaged in the openings in said parts and having a first portion axially securing said screw member in one of said parts in at least one direction and having a threaded second portion axially spaced from said first portion, a nut member engageable with said second portion for axial takeup against the other part, means defining a central axial bore in said screw member having an opening at the axial end thereof receiving said nut member and terminating in a bottom wall adjacent said first portion of said screw member, a piston rod mounted in said bore and means securing said piston to said screw member adjacent the opening end of said bore, said piston rod extending into said bore with the lower axial end face thereof spaced closely adjacent said bottom wall of said bore, and located closely adjacent the connection of said screw member in said one part, the major portion of the outer peripheral surface of said piston rod extending axially from a first plane transverse to its axis below its connection to said screw member to a second transverse plane adjacent its lower end face being radially spaced from said bore to provide an annular space therebetween and a means defining an axial channel in said piston rod for conveying a pressure medium into the space defined by the axial end face of said piston rod and the bottom wall of said bore thereby to effect axial expansion of said screw member, and sealing means between the lower end of said piston rod and the wall of said, the outer peripheral surface of said screw member confronting the surface defining the opening in said other part being spaced therefrom to permit free axial expansion of said screw member upon pressurization of said space.

2. The combination according to claim 1, characterized by that the channel in the piston rod is provided at one end with means for connection to a pressure medium conduit.

3. The combination as claimed in claim 1 wherein said means securing said piston rod to said screw member comprises internal threads in said bore of said screw member and including a plug having tapered threads engagable with said internal bore threads when said piston is removed from said bore.

* * * * *